(12) United States Patent
Fairchild

(10) Patent No.: US 7,412,712 B2
(45) Date of Patent: Aug. 12, 2008

(54) FLEXIBLE MOUNTS FOR PARALLEL SHAFTS ON AN EXTENSION MECHANISM

(75) Inventor: Robert Fairchild, Cowan Heights, CA (US)

(73) Assignee: Quantum Corporation, San Jose, CA (US)

( * ) Notice: Subject to any disclaimer, the term of this patent is extended or adjusted under 35 U.S.C. 154(b) by 645 days.

(21) Appl. No.: 11/065,635

(22) Filed: Feb. 23, 2005

(65) Prior Publication Data

US 2006/0190951 A1    Aug. 24, 2006

(51) Int. Cl.
*G11B 17/03* (2006.01)

(52) U.S. Cl. ..................................... 720/632
(58) Field of Classification Search ............... 720/632, 720/659, 641, 651, 615; 369/30.45
See application file for complete search history.

(56) References Cited

U.S. PATENT DOCUMENTS

| | | | |
|---|---|---|---|
| 3,924,300 A | 12/1975 | Hilger et al. | |
| 5,500,847 A * | 3/1996 | Han | 720/665 |
| 5,690,463 A | 11/1997 | Yoshie | |
| 5,700,125 A | 12/1997 | Falace et al. | |
| 5,717,681 A | 2/1998 | Osada | |
| 5,760,995 A | 6/1998 | Heller et al. | |
| 6,097,566 A | 8/2000 | Heller et al. | |
| 6,167,781 B1 | 1/2001 | Madsen et al. | |
| 6,392,837 B1 | 5/2002 | Kim | |
| 6,438,623 B1 | 8/2002 | Ryan | |
| 6,552,866 B1 | 4/2003 | Lechner | |
| 6,570,734 B2 | 5/2003 | Ostwald et al. | |
| 6,574,173 B1 | 6/2003 | Manes | |
| 6,577,585 B2 * | 6/2003 | Aoyama et al. | 369/255 |
| 6,591,164 B1 | 7/2003 | Plutt et al. | |
| 6,648,574 B2 | 11/2003 | Williams | |
| 6,671,580 B2 | 12/2003 | Campbell et al. | |
| 6,751,040 B2 | 6/2004 | Gupta et al. | |
| 6,766,412 B2 | 7/2004 | Bolt | |
| 6,985,328 B2 | 1/2006 | Vanderheyden | |
| 7,009,798 B1 | 3/2006 | Gupta et al. | |
| 7,257,054 B2 * | 8/2007 | Lee | 369/44.32 |
| 2005/0051653 A1 | 3/2005 | Rathweg | |
| 2006/0188361 A1 | 8/2006 | Fairchild et al. | |

* cited by examiner

*Primary Examiner*—Allen T Cao
(74) *Attorney, Agent, or Firm*—Morrison & Foerster LLP

(57) ABSTRACT

Slider devices having a misalignment tolerance may include a slider frame and two or more approximately parallel shafts that are configured to elastically shift within fixed shaft supports. Each shaft is slideably disposed within one or more fixed shaft support, so that the slider frame may extend or retract along an axis approximately parallel to the long axis of the shafts. In some versions, the shafts are elastically mounted to the slider frame. Also described are methods of sliding a slider having misalignment tolerance by moving the slider device to extend or retract a slider frame comprising two or more approximately parallel shafts that are configured to elastically shift within fixed shaft supports.

19 Claims, 12 Drawing Sheets

FLEXIBLE MOUNTS FOR PARALLEL SHAFTS ON AN EXTENSION MECHANISM

BACKGROUND

1. Field of the Disclosure

Described herein are devices and methods for manipulating data storage media, particularly devices and methods for transporting storage media between or within storage media libraries.

2. Background

Automated storage systems, including cartridge libraries, are commonly used to store data storage media. One or more individual storage libraries may contain many data storage devices, as well as multiple media drives for reading from, and writing to the storage devices. Automated robotic devices may be used to move storage devices between the various storage cells, and to and from the media drives within the storage library. Individual storage devices may be indexed, and the entire system may be controlled by a device (or devices) capable of coordinating the movement of the storage devices.

One type of storage system includes two or more storage device libraries that may be linked together for coordinated control. With this type of system, each library may include a library housing, a plurality of storage devices (e.g., cartridges) stored in one or more storage device bins within the housing, at least one robotic handling mechanism, and one or more media drives. If multiple libraries are used as part of the same storage system, it may be desirable to coordinate the handling of storage devices between individual storage libraries. Moving storage devices between libraries may help avoid bottlenecks and delays. For example, if many storage devices in a storage library are requested at the same time, delays may result if the number of demanded storage devices exceeds the number of media drives, or the ability of the robotic handlers to process the demand. Thus, it may be desirable to distribute storage devices between libraries. Further, if one or more of the storage device drives in a library fails, it may be desirable to transfer storage devices to another library having functional drives.

Transfer mechanisms have been developed to transfer storage devices between storage libraries. These transfer mechanisms typically include hardware that provides or assists movement of storage devices between individual libraries. In general, simple and inexpensive transfer mechanisms take up useful space within a storage library (e.g., space that could contain other storage bins or media drives). For example U.S. Pat. No. 6,438,623 to Ryan (herein incorporated by reference in its entirety) describes a movable cartridge bin that moves in a straight line between the storage libraries, along a pathway that spans two or more storage libraries, and takes up useful space within the storage library.

Transfer mechanisms must be accessible to a robotic handler (or to some other data storage device manipulators) within each library cavity. However, the transfer mechanism must also move the data storage device between the libraries and avoid interfering with other portions of the library such as the storage bins or media drives. Practically speaking, a robotic handler within a storage library may have a limited range of motion, resulting in a finite amount of useful space within a storage device library that can be accessed by the robotic handler. Thus, it may be desirable to minimize the amount of useful space needed by the transfer mechanism.

Most transfer mechanisms capable of transferring storage devices between storage libraries include a track connecting the storage libraries. The storage device transfer mechanism typically moves in one dimension along the track, and therefore the track must take up useful space within the library cavity so that the transfer mechanism can be accessed by a robotic handler. For example, U.S. Pat. No. 5,760,995, U.S. Pat. No. 6,648,574, U.S. Pat. No. 6,751,040, U.S. Pat. No. 5,700,125, U.S. Pat. No. 6,574,173, and U.S. Pat. No. 6,438,623 describe transferring storage devices that move in only one dimension down a track. All of these references are herein incorporated by reference in their entirety.

Accordingly, there is a need for a simple storage device pass-through transfer mechanism. In particular, there is a need for a slider device having a misalignment tolerance that may provide two-dimensional motion from a single driver and may be configured as a shuttle to move and reliably extend and retract for loading and unloading of storage media. None of the cited prior art suggests the device and methods described and claimed below.

BRIEF SUMMARY

Described herein are slider devices and methods of using them. These slider devices may be used with any application in which slider devices having some degree of misalignment tolerance would be useful. For example, a shuttle of a transporter used within a multi-library storage system may be configured as a slider device described herein. Thus, a shuttle may be moved between storage libraries, and may also be extended or retracted to provide a robotic handler with access to a storage device transported by the shuttle.

Slider devices having a misalignment tolerance may include: a slider frame; two parallel shafts elastically mounted to the slider frame; and a plurality of fixed shaft supports having passages therethrough, wherein each shaft is slideably disposed within the passage of at least one of the fixed shaft supports, so that the slider frame may extend or retract in a direction parallel to the shafts. In some variations, the slider device may include a carrier platform, wherein the fixed shaft supports are fixed to the carrier platform.

The slider frame may comprise a slider frame support to limit movement of the slider frame in direction that is not parallel to the parallel shafts. The slider frame support may be a cam follower.

The fixed shaft supports may comprise bushings. At least one of the fixed shaft supports may comprise a low-friction surface. In some versions, the shafts comprise a rigid material. The rigid material of the shafts may be selected from the group consisting of metal, ceramic, polymer, or some combination thereof.

In some versions, the slider device includes a plurality of shaft mounts, wherein the shafts are elastically mounted to the slider frame by the shaft mounts. The shaft mounts may comprise an elastic material at least partly surrounding the shaft. For example, a shaft mount may comprise an elastic O-ring. The elastic material may be selected from the group consisting of rubbers, polyisoprenes, polybutadienes, polyisobutylenes, urethanes and polyurethanes.

The slider device may further comprise a plurality of securing screws, wherein each shaft is secured within a shaft mount by a securing screw. The slider device may also comprise the shuttle of a storage system. Thus, the slider frame may be configured to hold a cartridge. A transporter for transporting a storage device may include a shuttle for holding a storage device that is configured as one of the slider devices described herein, and a cam follower for following a cam pathway.

Each elastically mounted parallel shaft of the slider device may shift in order to maintain the shaft extending in a direction that is parallel with the direction of the passage though the fixed shaft support through which the shaft is slideably disposed. For example, the slider device may include an elastic coupling that elastically deforms to make the shaft slide more easily in the passageway by aligning the shaft and the passageway.

Also described herein are slider devices having a misalignment tolerance comprising: a slider frame having two parallel shafts, wherein the slider frame is configured to be extended and retracted in a direction parallel to the shafts; and a shaft assembly for each shaft. Each shaft assembly comprises: one of the shafts; a shaft support having a passage therethrough, wherein said one shaft is slideably disposed within the shaft support; and an elastic coupling, wherein the elastic coupling is configured to elastically deform in order to keep said one shaft extending in a direction that is parallel with the direction that the passage through the shaft support extends.

Also described herein are methods of sliding a slider device having a high misalignment tolerance, comprising: moving a slider device to extend or retract a slider frame of the slider device. The slider device comprises: a slider frame; and a plurality of parallel shafts elastically mounted to the slider frame, wherein each of the parallel shafts is slideably disposed within a passage through a fixed shaft support.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION OF THE INVENTION

Figure 1:
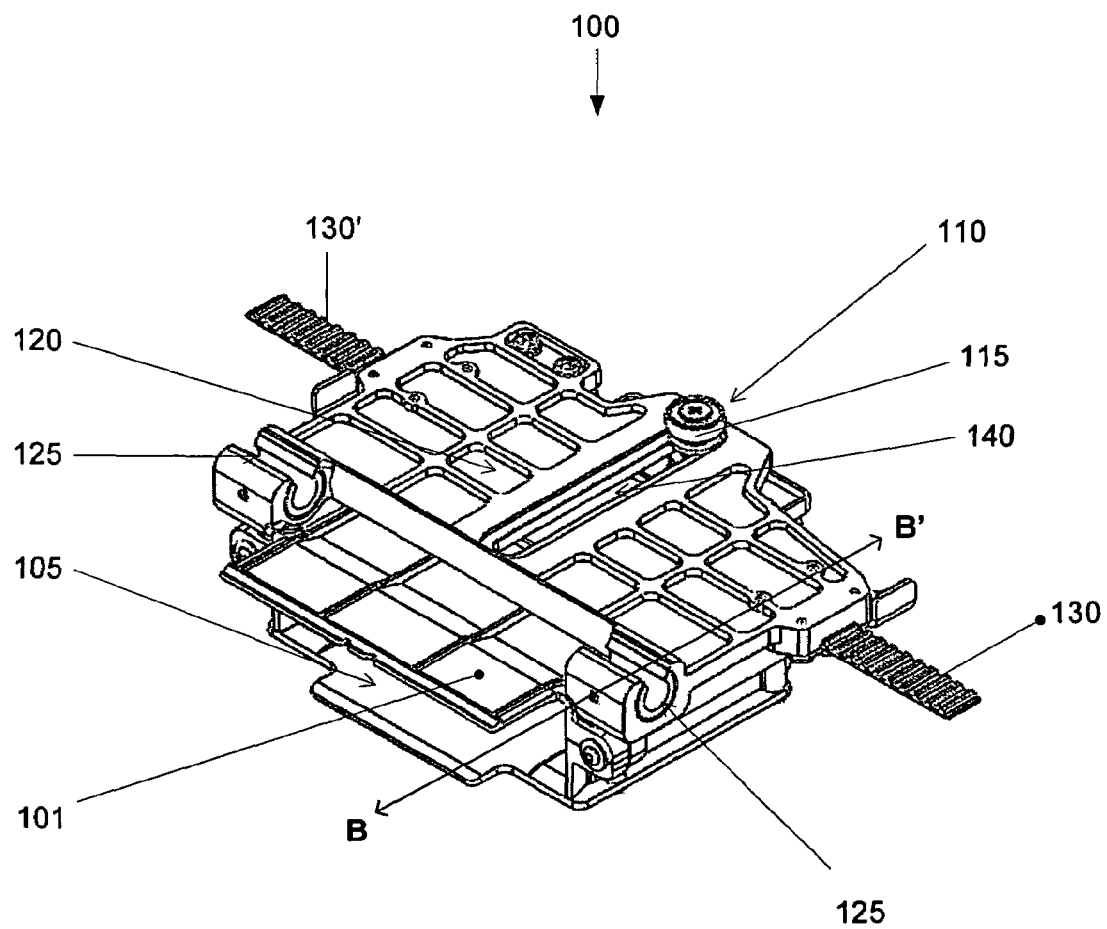
FIG. 1 shows a perspective view of one version of a transporter for transferring a cartridge.

Described herein are slider devices, and methods of using them, which may include using them for transferring storage devices (e.g., devices comprising storage media) from one storage library (e.g., a library containing multiple storage devices such as cartridges) to another storage library. The following descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limiting to the examples described and shown, but is to be accorded the scope consistent with the appended claims. The term "storage device" is used to describe any type of data storage device (including different storage media), and is not intended to be limited to one particular type, and includes tape media storage devices, optical media storage devices, solid-state storage devices, and any combination thereof, or any other embodiment of a data storage device. Although the examples of storage devices provided herein are predominantly tape cartridges, it should be understood that any appropriate type of storage device may be used.

In general, a slider device having a misalignment tolerance may be used for any application that may benefit from a slider frame that may be slide along two or more parallel shafts. The sliders described herein are particularly useful when the application benefits from a slider frame that may be robustly extended and retracted even when the shafts are misaligned, or when forces may act on the slider device, causing misalignment the shafts with respect to the shaft supports (though which they slide).

A slider may be used as part of a data storage system. In particular, the slider may be used as a shuttle of a data storage device transporter. The transporter may move in two dimensions, and the shuttle may be separately moved to extend and/or retract. Thus, forces may act on the shuttle (e.g., inertial forces) from a direction that is not parallel to the long axis of the shafts of the shuttle. Thus, a the shuttle of a storage system that includes a slider device having a misalignment tolerance may extend and retract, even when inertial or other forces would otherwise tend to misalign the shafts, and inhibit sliding. Storage systems include such transporters are described in more detail below.

A storage system may be used to store a plurality of storage devices (e.g., cartridges) in two or more storage libraries. Storage systems may also be used to transfer storage devices between the storage libraries. A storage library may include multiple storage bins for holding storage device, media drives for reading and/or writing to the storage devices and a storage device manipulator, such as a robotic picker or arm. An example of a storage library may be found in U.S. Pat. No. 5,760,995 to Heller et al., herein incorporated by reference in its entirety.

A plurality of storage libraries may be linked at coordinated pass-through regions. The pass-through regions allow a transporter carrying a storage device to move from one storage library to another (usually adjacent) storage library. A track may link all of the storage libraries, and may extend through the pass-through regions and within each storage library. A drive (such as a cable or belt drive) may be used to move the transporter along this track as it moves between and within storage libraries. A control system may be used to control the motion of the transporter so that the transporter may carry storage devices from a first storage library into a second storage library. Furthermore, the transporter may be positioned so that a storage device may be loaded or unloaded from the transporter by a robotic picker within a storage library. A cam pathway may be used to position the transporter so that it can be loaded by a robotic picker and then moved into another storage library.

Thus, a storage system may comprise a transporter and a track having a cam pathway. The track may span a plurality of storage libraries, and the transporter may be moved between these storage systems by a driver that propels the transporter in the directions that the track extends. The transporter typically comprises a cam follower connected to a shuttle. The shuttle of the transporter may hold a data storage device (e.g., a cartridge). Although the driver may move the transporter in one dimension (e.g., forward or backward along the track), the cam pathway and the cam follower may move at least the shuttle of the transporter in additional directions (e.g., at an angle to the direction of the track), allowing the shuttle of the transporter to move in two dimensions (e.g., in an x, y plane), even if the driver only applies force in one dimension. As the driver moves the transporter along the track, the cam follower follows the cam pathway and moves shuttle of the transporter. In this way, the cam follower and the cam pathway may translate the one-dimensional movement of a single driver into two-dimensional movement, and thereby precisely position the shuttle of the transporter.

Transporter

The transporter may be used to carry a storage device such as a cartridge between a first and a second storage library, and may comprise a shuttle and a cam follower. The entire transporter may move within and between storage libraries. In some versions, a portion of the transporter is configured to move in the direction of a track spanning at least a plurality of storage libraries. For purposes of simplicity, the direction of a track spanning a plurality of storage libraries may be thought of as "side to side." A driver may be used to move the transporter in side to side the direction of the track, as described further below. A transporter may also be configured so that the transporter (or a region of the transporter) may move in a direction other than side to side. For example, the transporter may be configured to move at an angle to the "side to side" direction.

In one version, at least a portion of the transporter may move in a direction perpendicular to the direction of the drive motion. Thus, the transporter may be moved "backwards and forwards." The transporter may comprise different regions that are configured to move in different directions. In some versions, the transporter comprises a carrier platform that is configured to be moved (e.g., side-to-side) by a driver, and a shuttle that is configured to be moved (e.g., backwards and forwards) by a cam follower. The shuttle may be slideably connected to the carrier platform, and supported by the carrier platform, so that the shuttle moves with the carrier platform in the direction of the driver and the shuttle also moves relative to the carrier platform to extend or retract the shuttle.

FIG. 1 shows a perspective view of one version of a transporter 100. A carrier platform 120 is shown attached to a belt driver 130, 130' configured to pull the carrier platform (and thereby the transporter) in one dimension (e.g., side to side). The carrier platform may be movably connected to a support. For example, a track spanning one or more storage libraries may include a rod by which a portion of the transporter, such as the carrier platform, may slide along. In FIG. 1, the carrier platform 120 has two sliding attachments 125 that can connect to a portion of the track (e.g., a rod) and slide along this portion of the track when the transporter is moved by the driver. The carrier platform may comprise any appropriate shape to allow movement of the transporter by a driver. Furthermore, although the carrier platform shown in FIG. 1 has attachment regions (shown as bushings) 125 that rest on rods or the track region, the carrier platform may be fully supported by the driver (e.g., belts, cables, etc.) or may be supported by any other appropriate structure that allows the transporter to move, and does not need to be supported by the track (e.g., rods).

The shuttle 101 of the transporter 100 shown in FIG. 1 is configured to hold a media cartridge. The shuttle may be configured to carry any appropriate storage media, or more than one storage media devices (e.g., multiple cartridges). The shuttle 101 shown in FIG. 1 comprises an opening 105 providing access to a holding bin for holding storage media. Thus, the shuttle 101, comprises an opening and a holding bin that may be configured to hold a specific type or size of storage media. A cartridge may be inserted or removed from the holding bin through the opening 105 of the shuttle. A robotic picker may be used to control insertion and removal of storage media into the shuttle of the transporter. In some versions, the shuttle may also include a securing mechanism (e.g., a latch, a catch, etc.) to prevent a cartridge from being unintentionally dislodged from the shuttle. The shuttle may also be movably connected to the carrier platform, so that the shuttle may move with respect to the carrier platform. In some versions, the shuttle is configured as a slider device. The slider device may extend or retract along shafts, as described further below. Thus, the shuttle may extend or retract with respect to the carrier platform.

The transporter may further comprise a cam follower 110. The cam follower contacts a cam pathway, and may move the shuttle 101 with respect to the carrier platform 110 as directed by the cam pathway. In general, the cam follower comprises a contact bearing having a surface that is configured to contact a cam pathway. In some versions, the contact bearing is attached to a post, or comprises a region of a post projecting from the shuttle. In FIG. 1, the cam follower 110 is connected to the shuttle, and the cam follower projects from the shuttle through a guide track or channel 140 in the carrier platform. In some versions, the contact bearing portion of a cam follower is movably attached (e.g., by a screw or the like, that permits the contact bearing portion to move with respect to the rest of the cam follower). In FIG. 1, the cam follower terminates in a contact bearing that is configured as a roller 115. The roller may rotate to reduce friction between the cam follower and a cam pathway (e.g., a cam pathway that is part of a track). In some versions, the cam follower comprises a contact bearing that may include a ball bearing. In some versions, the cam follower may not comprise a moveable contact bearing. In some versions, the cam follower (e.g., the contact bearing region) may comprise a material or a coating to reduce friction. In some versions, the cam follower or any surface that it contacts may comprise a lubricious material (e.g., Fluoropolymers such as Teflon, PTFE, FEP, or the like). In some versions, the cam follower may comprise a lubricant (e.g., oils, waxes, etc.). The cam follower (particularly the contact bearing) may comprise a low-friction surface.

The cam follower may be held in a guide track 140 region of a carrier platform 120, as shown in FIG. 1. A guide track may help guide the motion of the cam follower and the shuttle as the cam follower is moved along the cam pathway. Thus, the cam follower may be positioned in a guide track and in a cam pathway. The cam follower may be secured within a guide track.

The cam follower and/or the guide track may be configured to minimize friction between the guide track 140 and the cam follower. For example, the cam follower (e.g., a post region of a contact bearing) may be configured to rotate or may comprise a low-friction surface. In some versions, the points of contact between the cam follower and a guide track (or the cam pathway) comprise a low-friction surface, or may otherwise facilitate motion between the cam follower and the contact surface. In some versions, the cam follower further comprises a guide assist (e.g., a spring, a locking mechanism, a supporting structure, etc.) to hold the cam follower within the cam pathway and/or a guide track.

Figure 2:
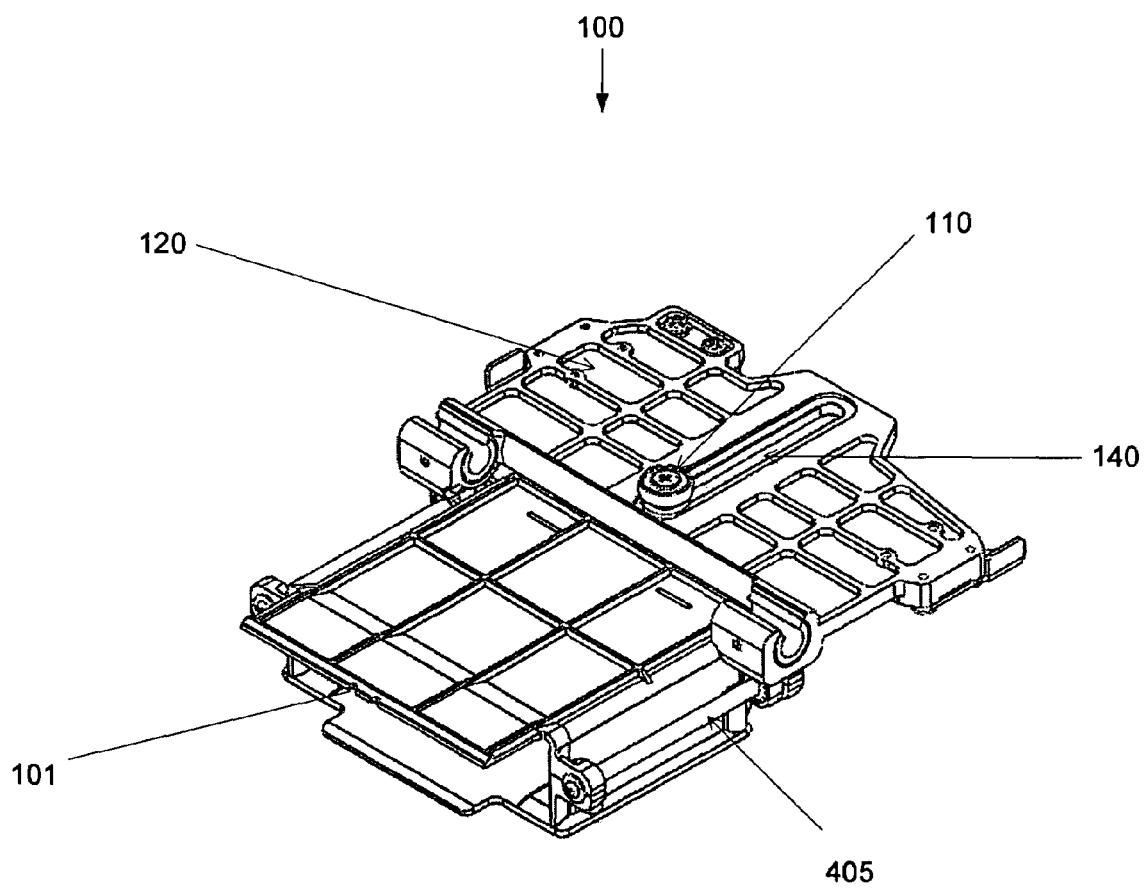
FIG. 2 shows another perspective view of the transporter shown in FIG. 1 in which a shuttle is extended.

FIG. 2 shows a perspective view of the transporter of FIG. 1, in which the shuttle 101 has been extended from the carrier platform 120. In FIG. 2, the cam follower 110, which is attached to the shuttle 101, has moved with the shuttle within the guide track 140. Thus, the cam follower may be used to position (e.g., to extend and retract) the shuttle. In some versions, the motion of the cam follower is not restricted by a guide track in the carrier platform.

In general, any appropriate driver may be used to move the transporter in the direction of the track. In some versions, the storage system comprises only a single driver for moving and positioning the transporter. The driver may comprise a motor, a gear system, a cable system, a rotatable shaft, etc. The driver may be configured so that it is attached to the transporter, or it may not continuously, or directly, contact the transporter. The driver connectors (e.g., belts) shown in FIG. 1 are not shown in FIG. 2.

Figure 3:
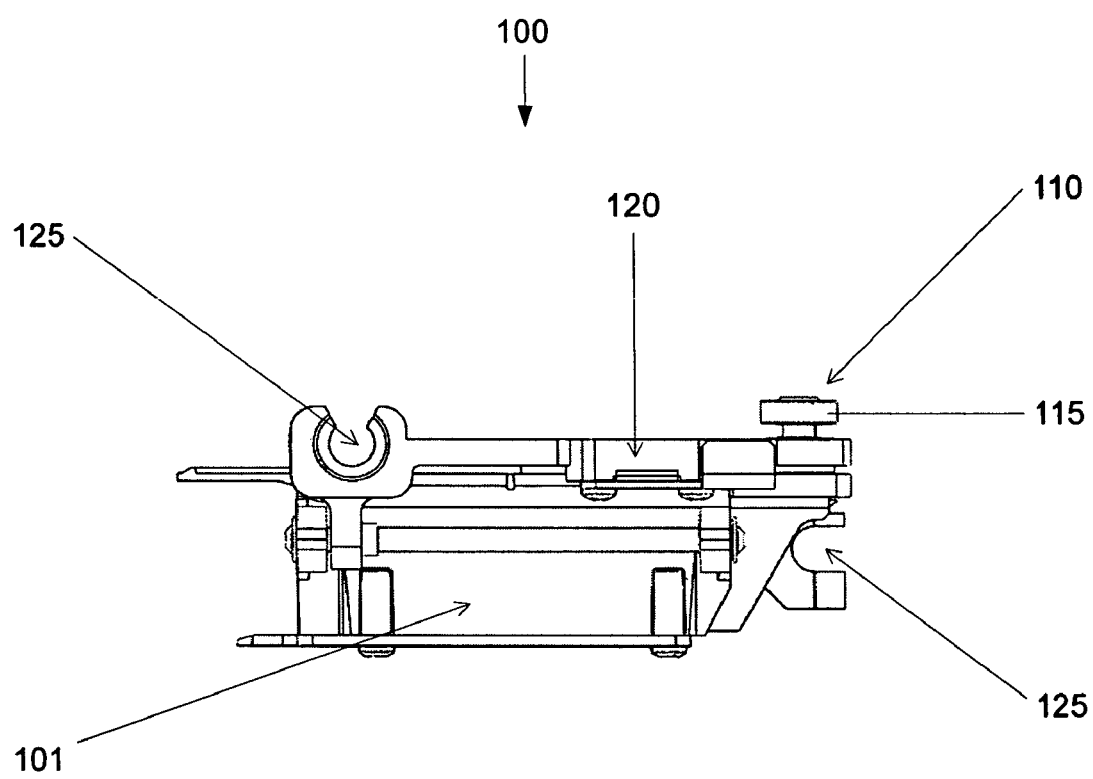
FIG. 3 shows a side view of the transporter shown in FIG. 1.
Figure 4:
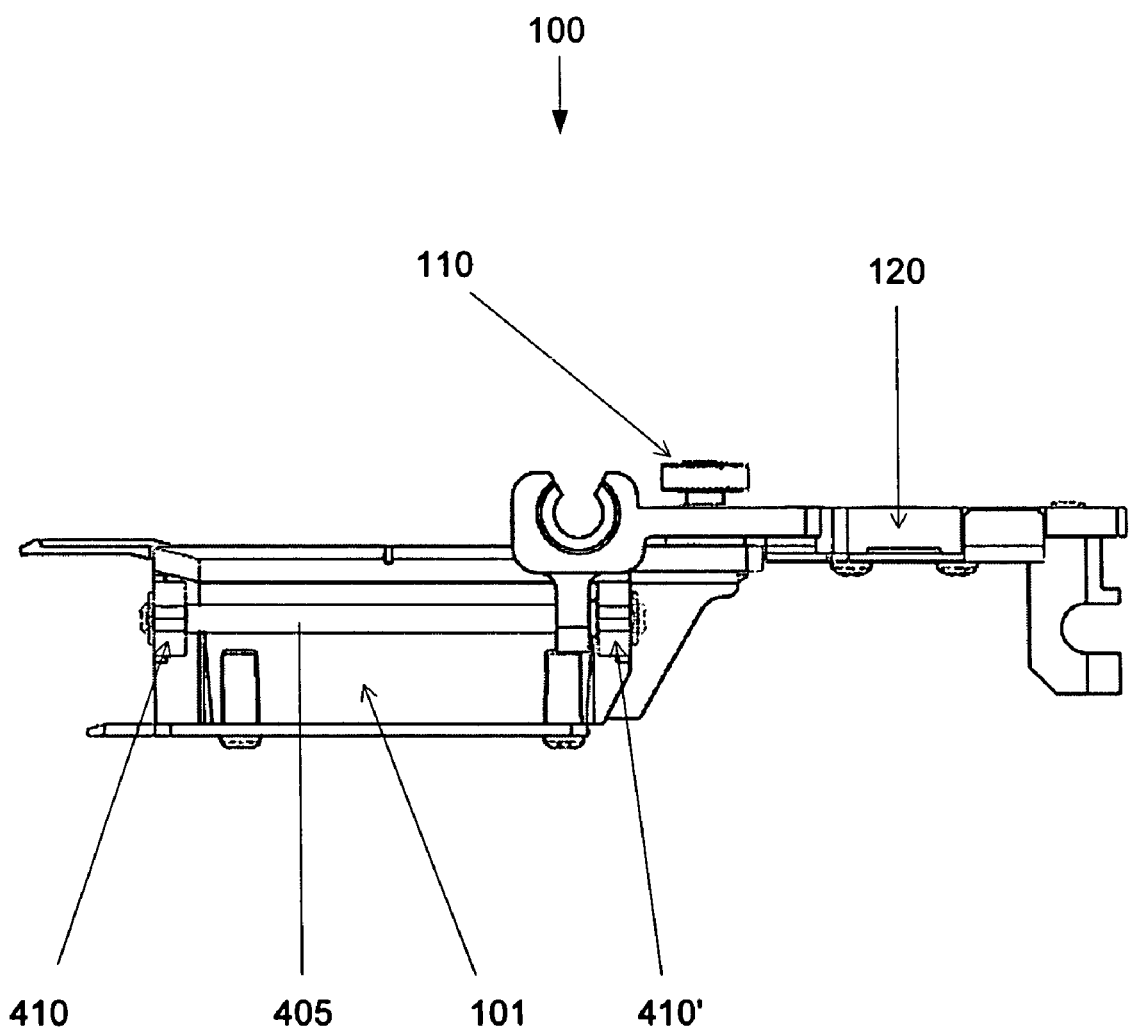
FIG. 4 shows a side view of the transporter of FIG. 3, in which the shuttle is extended.

FIGS. 3 and 4 show side perspective views of a transporter with an unextended and an extended shuttle, respectively. In FIG. 3, the carrier platform 120 shows two movement-allowing attachment sites 125, where the carrier platform may be supported (e.g., on a region of the track, such as rods that extend between the libraries). These movement-allowing attachment sites may allow the carrier platform (and thus the transporter) to slide, and therefore move, when the driver pushes, pulls or otherwise moves the transporter. In FIGS. 1 to 4, the shuttle 101 is connected to the cam follower 110, where it projects past the carrier platform 120, so that it may mate with a cam pathway region of the track (not shown). The region of the cam follower that mates with the cam pathway is the contact bearing, shown as a roller 115 that may roll within the cam pathway. As the cam follower moves within the cam pathway, the cam follower may move the shuttle 101 to extend or retract from the carrier platform. In FIG. 4, the shuttle is shown in a fully extended position. The shuttle may be extendible by the movement of the cam follower. In FIGS. 1-4, the shuttle is configured as a slider device.

Slider Device

Generally, a slider device comprises a slider frame having two parallel shafts. Each shaft may be slideably disposed within a shaft support. The shaft support may be fixed in place (e.g., by being fixed to a carrier platform, or part of a carrier platform). A shaft support typically includes a passage through which a shaft may slide (and be supported). The passage may be of any length, and may fit snuggly around a shaft passing through it. A shaft support and a shaft that is slideably disposed within the shaft support may be referred to as a shaft assembly. The slider device (including the shaft assembly) may comprise an elastic coupling that may elastically deform to permit or facilitate the sliding of the shaft with respect to the shaft support, so that the slider frame may extend or retract.

The term "parallel," when used to describe the directions of shafts, and the relationship between the direction that a shaft extends and the direction that a shaft support passageway extends may be mean substantially parallel. For example, two parallel shafts may be less than 5° off-axis, or less than 2° off-axis, or less than 1° off-axis, or less than 0.25° off-axis, or completely on-axis. Similarly, a shaft may extend in a direction that is parallel to the direction that passage through a shaft support extends when the shaft is movable within that shaft support passage (e.g., when the direction of the shaft and the direction of the shaft support passage are less than 5° off-axis, or less then 2° off-axis, or less than 1° off-axis, or less than 0.25° off axis).

In general, some region of the slider device may elastically deform so that a shaft may slide within a shaft support (e.g., a shaft support having a passage therethrough). Thus, the slider device may deform or shift in order to keep the direction that a shaft extends (e.g., a long axis of a shaft) substantially parallel with the direction through the shaft support that the shaft is permitted to slide. For example, if the direction that the shaft extends is not parallel to the direction of a passageway through the shaft support, the shaft may not be able to easily slide through the shaft support, and thus the slider device may not extend or retract smoothly. Various elastic couplings may be used so that a shaft may be shifted to maintain the direction of the shaft in parallel with the direction through the shaft support. For example, the shaft mounting may comprise an elastic (e.g., an O-ring), the shaft may comprise an elastic material (e.g., a coating or the shaft may be made of an elastic material), or the shaft support may comprise an elastic material (e.g., the shaft support may be elastically mounted to a carrier platform).

In some versions, the shaft assembly also includes an elastic mounting. The elastic mounting may be any structure that provides either the shaft or the shaft support with any degree of elastic compliance, allowing the shaft assembly to flex and permit the shaft to slide. An elastic mounting may also allow the shaft assembly to return to a neutral (e.g., "center") position when the forces acting on the slider device fall below a threshold. For example, the elastic mounting may be an elastic layer surrounding the shaft. In one version, the elastic mounting comprises elastic shaft mounts connecting the shafts to the slider frame.

Figure 5:
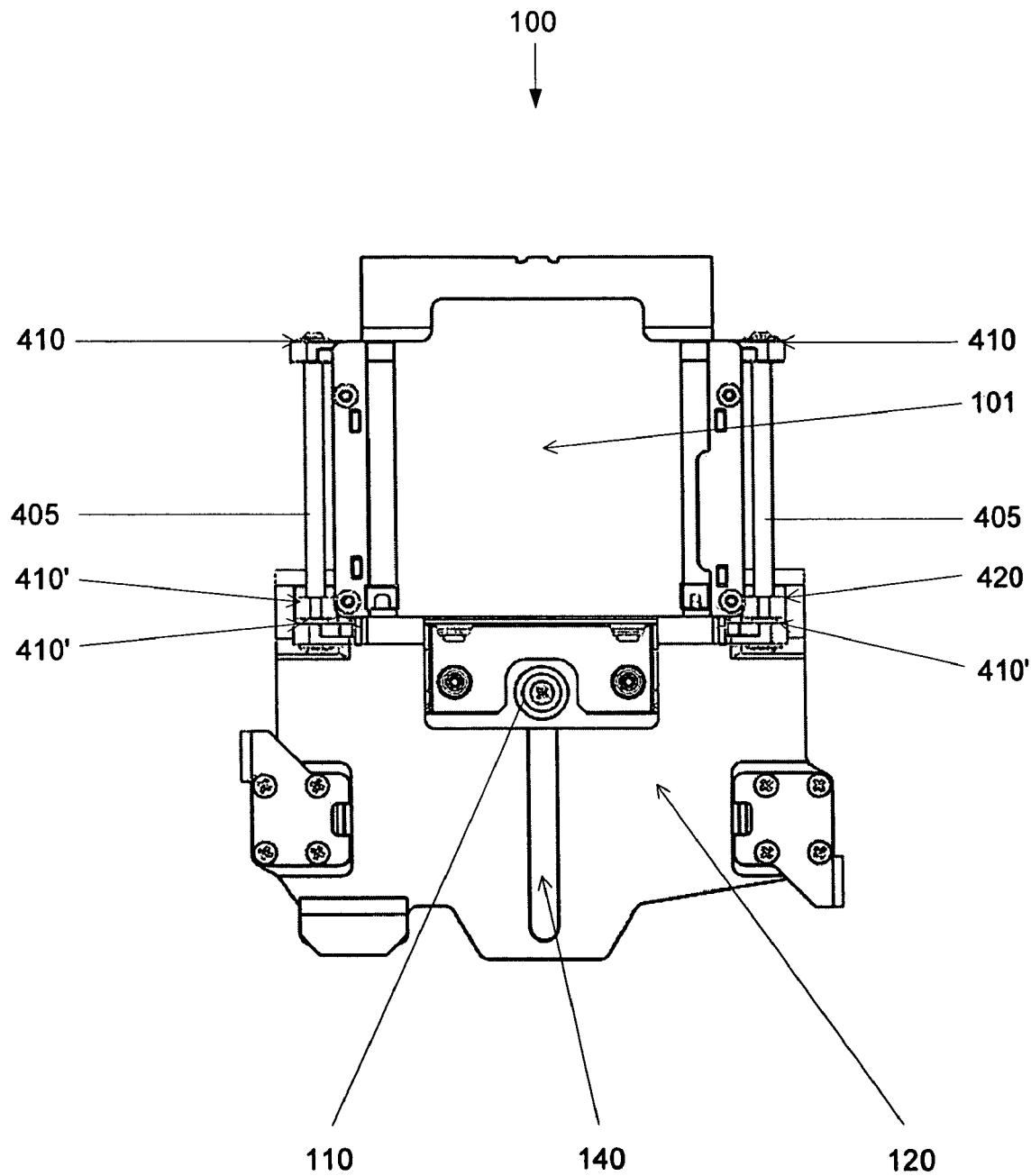
FIG. 5 shows a top view of the transporter of FIG. 4.

A slider device may extend and retract along two or more approximately parallel shafts. For example, the shuttle may be a slider device configured to extend and retract from a carrier platform along two approximately parallel shafts 405, 405', as shown in FIG. 5. FIG. 5 shows a bottom view of a transporter 100 with an extended shuttle 101, similar to the side view shown in FIG. 4. The shafts 405, 405' connect to the shuttle by shaft mounts 410, 410' (also visible for one shaft in FIG. 4). In FIGS. 4 and 5, the shuttle is shown supporting the extended carrier platform 120 by shaft support 420 which is part of the carrier platform 120. Both shafts are supported by a shaft support that encircles the shaft, and allows it slide therein. Thus, by sliding on the shafts 405 in the shaft support, the shuttle 101 may be moved from a first retracted position (as shown in FIG. 3) to a second extended position (as shown in FIG. 4). In these figures, the shuttle is linked to the carrier platform by movable attachments to the shaft supports 420 and to the cam follower's connection to the guide track 140.

The slider device shown in FIGS. 3, 4 and 5 has a misalignment tolerance because the shafts are elastically mounted to the slider frame, providing radial compliance at both ends of the shafts. The radial compliance may compensate for small (e.g., less than 10 degrees, less than 5 degrees, less than 1 degree, or less than 0.25 degrees) concentric misalignments of the shafts with the shaft supports.

Because of the radial compliance of slider devices that have a misalignment tolerance, the slider device may still extend and retract when the shafts are only approximately parallel. For example, in some versions, the shafts are slightly off-axis from each other (e.g., not parallel). In some versions, the angle between the long-axis of two of the shafts is less than 10 degrees. In some versions, this angle is less than 5 degrees. In some versions, this angle is less than 2.5 degrees. In some versions, this angle is less than 1 degree. In some versions; this angle is less than 0.25 degrees. In some versions, the shafts are parallel. The radial compliance of the shafts may depend upon the elastic mounting. For example, more compliant elastic mountings may result in more radially compliance in the shaft.

The shafts may be any appropriate material for supporting the slider frame. For example, the shafts may comprise the same material as the slider frame. In some versions, the shafts may be made of a different material from the slider frame and elastically mounted to the slider frame, as described above. The shafts may comprise a stiff material. In some versions, the shafts may comprise an elastic material. For example, the shafts may comprise a layer of an elastic material, particularly at ends which are mounted to the slider frame. Thus, the sliders may comprise a plastic, a ceramic, a metal, or any appropriate combination thereof.

In some versions, the shafts may be elastically mounted to the slider frame. For example, the shafts may be surrounded by an elastic material at the attachment sites to the slider frame, or the shafts may themselves comprise an elastic material, particularly at these sites. In some versions, the slider device comprises an elastic mounting that is configured as a shaft mounting. The shaft mounting may be an elastic O-ring. In some versions, the shaft mounting comprises elastic bearings.

In general, elastic materials, such as the elastic material comprising the elastic mountings, are capable of returning to an initial form or state after deformation. Examples of elastic materials may include, but are not limited to, rubbers, elastomers, (e.g., polyisoprene, natural rubber, polybutadiene, polyisobutylene, urethanes and polyurethanes, etc.). Thus, elastic materials used in the device (e.g., as elastic couplings) may elastically deform. For example, an elastic coupling (e.g., an O-ring, an elastic coating, etc.) may compress (deform) under force, and later return to the same configuration after the force is removed.

Thus, a slider device may compensate for variations in the center distances (e.g., misalignments) that may arise during the assembly or operation of the slider device. The shafts may be elastically mounted to the slider frame so that the shafts may move slightly within the slider frame mount when a force is applied to the slider frame (including the shafts). For example, if both shafts are not aligned perpendicular to the channel through the shaft support when extending or retracting the slider device, an elastic mounting of the shafts to the slider frame may permit movement of the shafts within the shaft supports, and thereby permit movement of the slider frame.

The shafts may be supported by one or more shaft supports that allow the shafts (and therefore the slider frame to which the shafts are flexibly mounted) to be movable within the shaft supports. In some versions, the shafts are slideably movable within passages through the shaft supports. The passage through the shaft support may surround the shaft (e.g., may form a "tunnel" through the shaft support), or the passage may be open on one or more sides, so that it does not enclose the sides of the shaft completely. In general, the shaft support passage may have a "direction" through which the shaft may slide. For example, the direction of the shaft support passage may be an axis through the centerline of the passage.

The shaft assembly of the shaft and shaft support may also comprise a lubricious, low-friction surface to decrease friction between the shafts and the shaft supports. Thus, the shaft support may comprise a material having a low friction with respect to the shafts, or it may be coated with such a material (e.g., a fluoropolymer). In some versions, the shaft supports comprise a lubricant to decrease friction between the shafts and the shaft supports (e.g., an oil, wax, etc.). The shaft supports may comprise bushings that are fixed with respect to the slider frame and shafts. For example, a carrier platform may comprise shaft supports 420, as shown in FIG. 4.

Figure 6A:
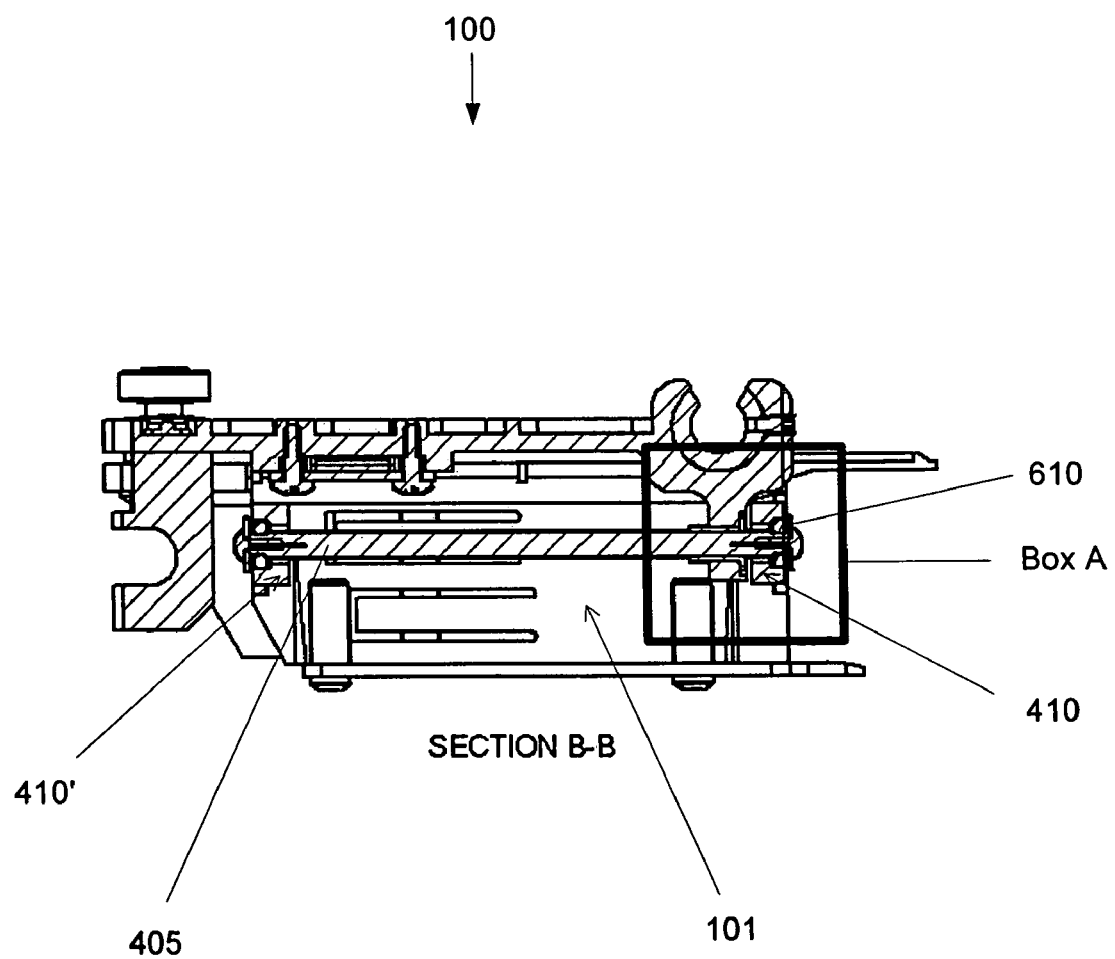
FIG. 6A shows a cross-section of the transporter shown in FIG. 1 along line B-B'.
Figure 6B:
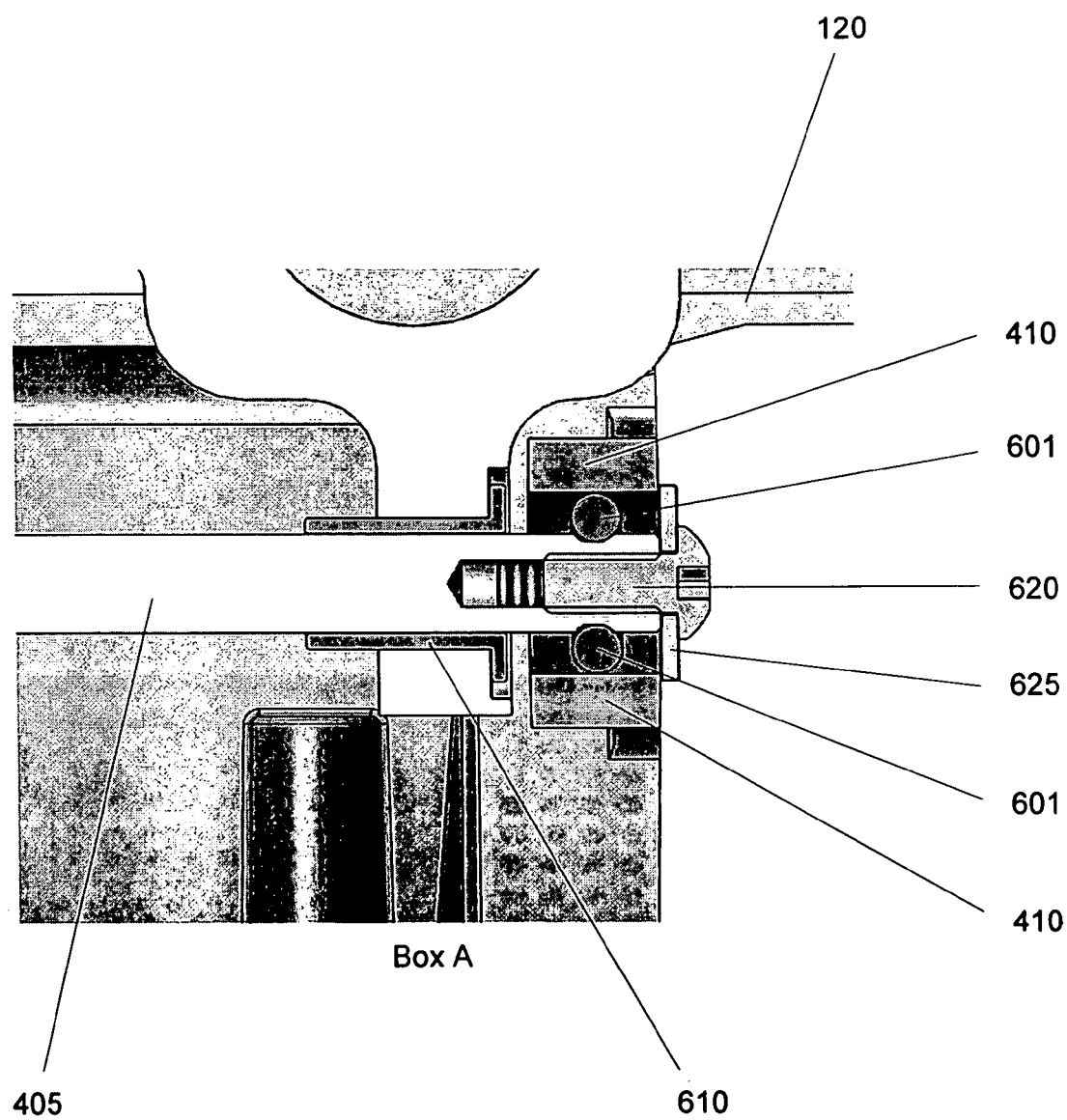
FIG. 6B shows a magnified view of region A from the transporter shown in FIG. 6A.

FIG. 6A shows a cross-sectional view of one version of a slider device wherein the slider device comprises the shuttle of a storage device system configured to hold a cartridge, as illustrated in FIG. 1. FIG. 6A corresponds to section B-B' of FIG. 1. In FIG. 6A, one of the two approximately parallel shafts 405 are shown in cross-section. The shaft is flexibly mounted at either end to shaft mounts 410 that secure the shaft to the slider frame (shown here as the shuttle 101 of the transporter). In FIG. 6A, the shaft is secured within the shaft mount by an O-ring 601 that fits over the outer diameter of the shaft, and within the inner diameter of the shaft mount. FIG. 6B shows a magnified view of the flexible mount of FIG. 6A.

The O-ring 601 shown in cross-section in FIGS. 6A and 6B has a circular profile, and surrounds both ends of the shaft; flexibly securing the shaft in the shaft mounts 410. The O-ring may comprise any suitably elastic material, including elastomers. Furthermore, the O-ring may comprise any suitable shape (e.g., donut-shaped, washer-shaped, etc.), or suitable size, in order to secure the shaft within the shaft mount so that the shaft may elastically shift within the shaft mount 410. For example, in operation, if the shaft is slightly misaligned with respect to the shaft support 610, the end of the shaft shown in FIG. 6B may shift within the shaft mount 410 by compressing a portion of the O-ring 601. The shaft may later return to the original (centered) position, when the O-ring is permitted to return to its original position (e.g., when the shaft is no longer misaligned with respect to the shaft support).

In FIG. 6B, the shaft 405 is positioned within a shaft mount 610. The shaft mount 610 is part of a carrier platform 120. The shaft fits snuggly within the shaft mount, however the shaft may be moved (e.g., slid) within the shaft mount. The outer, shaft-facing surface of the shaft mount may comprise a sliding surface (e.g., a low-friction surface) permitting motion of the shaft along the longitudinal axis of the shaft. Although FIG. 6A and 6B show only a single shaft support for a single shaft, more than one shaft support may be used. In some versions, the shaft support may interlock with the shaft (e.g., the shaft may comprise a channel into which a pin or key region on the shaft support fits.

A shaft may be secured within a shaft mount by a holdfast. FIG. 6A and 6B show a shaft secured within the shaft mount 410 by a holdfast configured as a securing screw. The securing screw 620 is screwed into the body of the shaft, and the end of the screw is flanged to prevent the shaft from leaving the shaft mount. A washer 625 may also be used to secure the shaft within the shaft mount. Any appropriate holdfast may be used to secure the shaft within the shaft mount. Furthermore, although the shafts are shown flexibly mounted at their ends, a slider device may comprise shafts that are flexibly mounted anywhere along the shafts.

In some versions, the slider frame of the slider device may further comprise a slider frame support to limit the motion of the slider frame in a direction that is at an angle to the long axis of the approximately parallel shafts. For example, in FIGS. 1-6, the cam follower may be a slider frame support, because it may be secured within the guide track 140 and help support the weight of the shuttle.

In some versions of the slider device, the shafts may be elastically held within the shaft supports. Thus, an elastic mounting may be a part of the shaft supports. For example, the shaft supports may be at least partly composed of an elastic material permitting the shaft assembly to shift when the shaft is misaligned within the shaft support. In some versions, the shaft support may be flexibly mounted to an additional structure (e.g., a carrier platform 120). In some versions, the shaft support may include an elastic sleeve through which the shaft passes.

Track

A track may span one or more adjacent libraries. The track may comprise a cam pathway for guiding at least a shuttle of the transporter. In general, a track connects two or more storage libraries. That is, the track may comprise a straight-line connection between adjacent storage libraries. One or more portion of the transporter may be connected (e.g., with a movement-allowing connection) to the track, including the cam follower.

In some versions, the track comprises one or more rods (e.g., cylindrical rods) at different levels with respect to the horizontal plane of the storage library that may support the transporter (e.g., within the carrier platform). These rods may comprise any appropriate material (e.g., metal, plastic, etc.) and may include a lubricious, low friction surface, or a lubricant. The track may comprise a shelf region to hold the cam pathway. The track may be positioned within the storage libraries to be out of the way of the "useful space" in the storage library. Thus, the track may be positioned so as not to interfere with bins for cartridges (or any other appropriate storage media) or media drives. For example, the track may be positioned in an area otherwise inaccessible to the storage media manipulators such as robotic pickers, or other components of the storage library.

Figure 7:
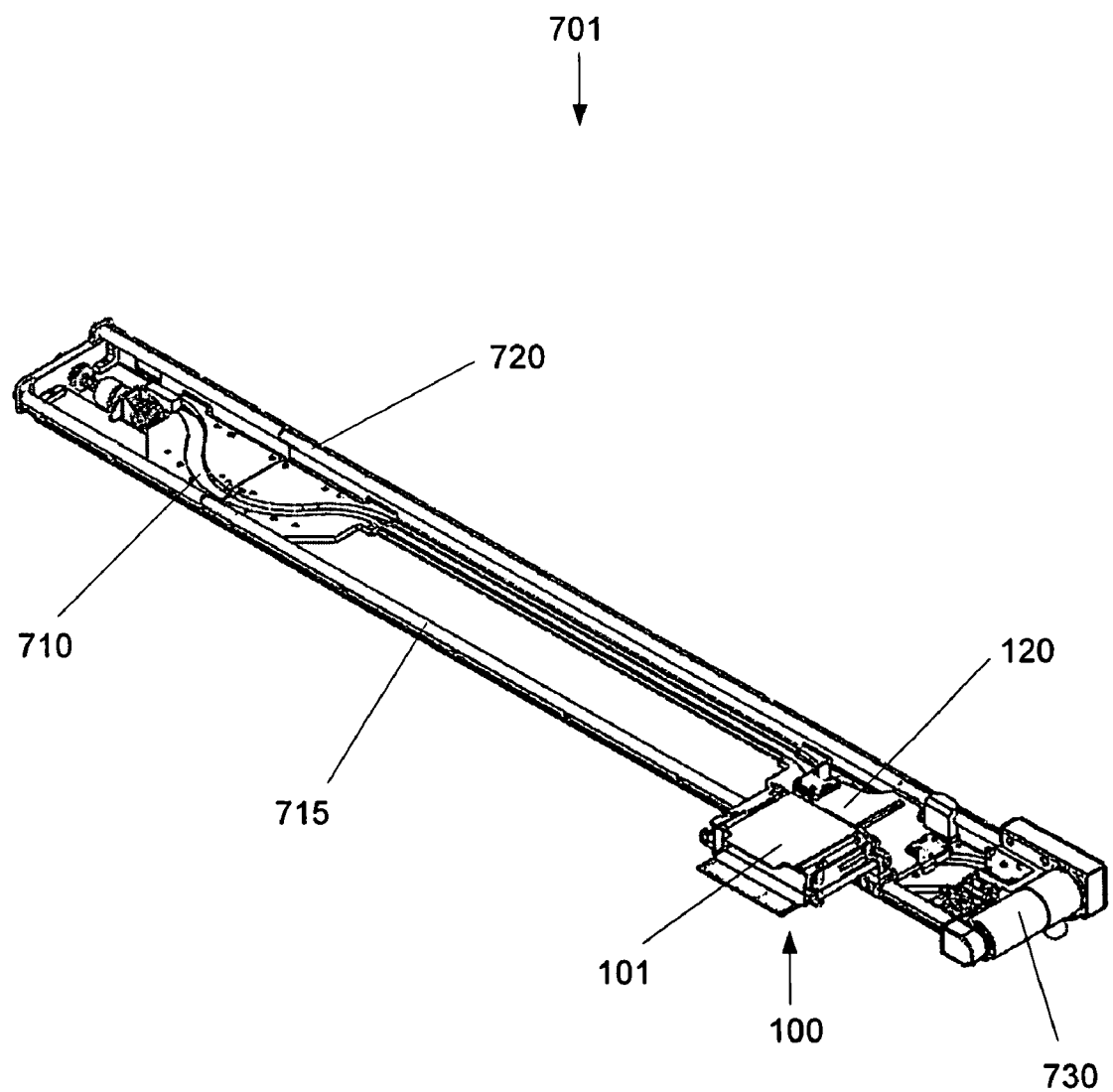
FIG. 7 shows a perspective view of a track and a transporter on the track.

FIG. 7 shows a track 701 comprising a cam pathway 710 and support rods 715, 720. A transporter 100 is also shown supported by the two rods 715, 720. A driver, comprising a motor 730, and a belt (not shown) may be connected to the transporter (e.g., to the carrier platform 120 of the transporter). The transporter is shown with the shuttle 101 extended. The track and transporter shown in FIG. 7 may be used in any appropriate orientation. For example, in FIG. 7, the transporter is shown above the cam pathway. However, the cam pathway may also be located above the transporter. In some version, the track may be located beside the transporter. In some versions, the track and the transporter are adjacent to each other and extend upwards and downwards to connect vertically adjacent libraries.

The track may be segmented. For example, the track may span one, two, or more than two libraries, and additional "modules" of the track (including the cam pathway and support rods) may be added as additional libraries are added. Portions of the track (e.g., the cam pathway, the rods, etc.) may be attached at various points within each connected library. Furthermore, additional segments may be added to the track to connect additional storage libraries. In FIG. 7, the track is shown connecting two storage libraries.

Figure 8:
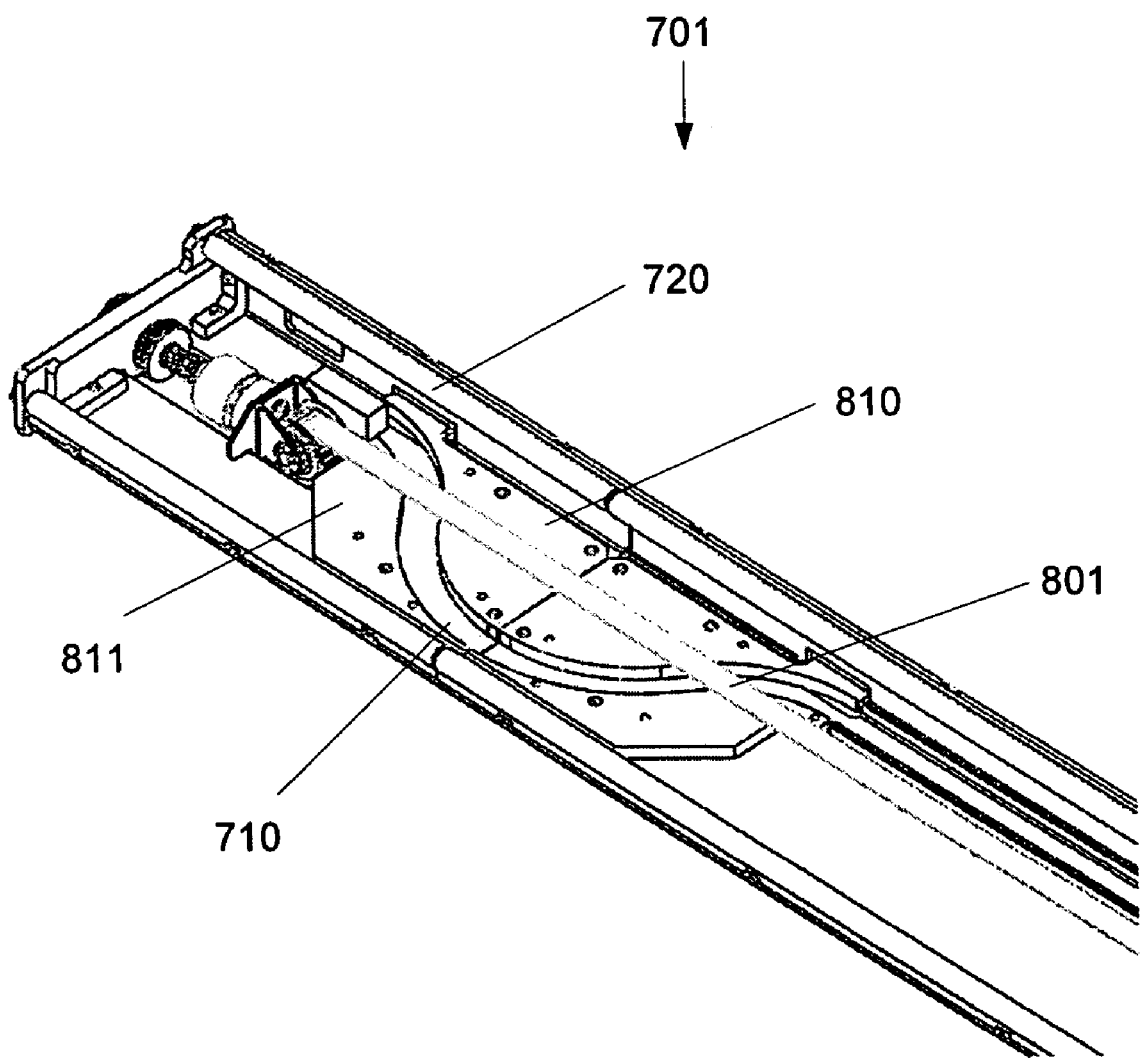
FIG. 8 shows a perspective view of one end of a track.
Figure 9:
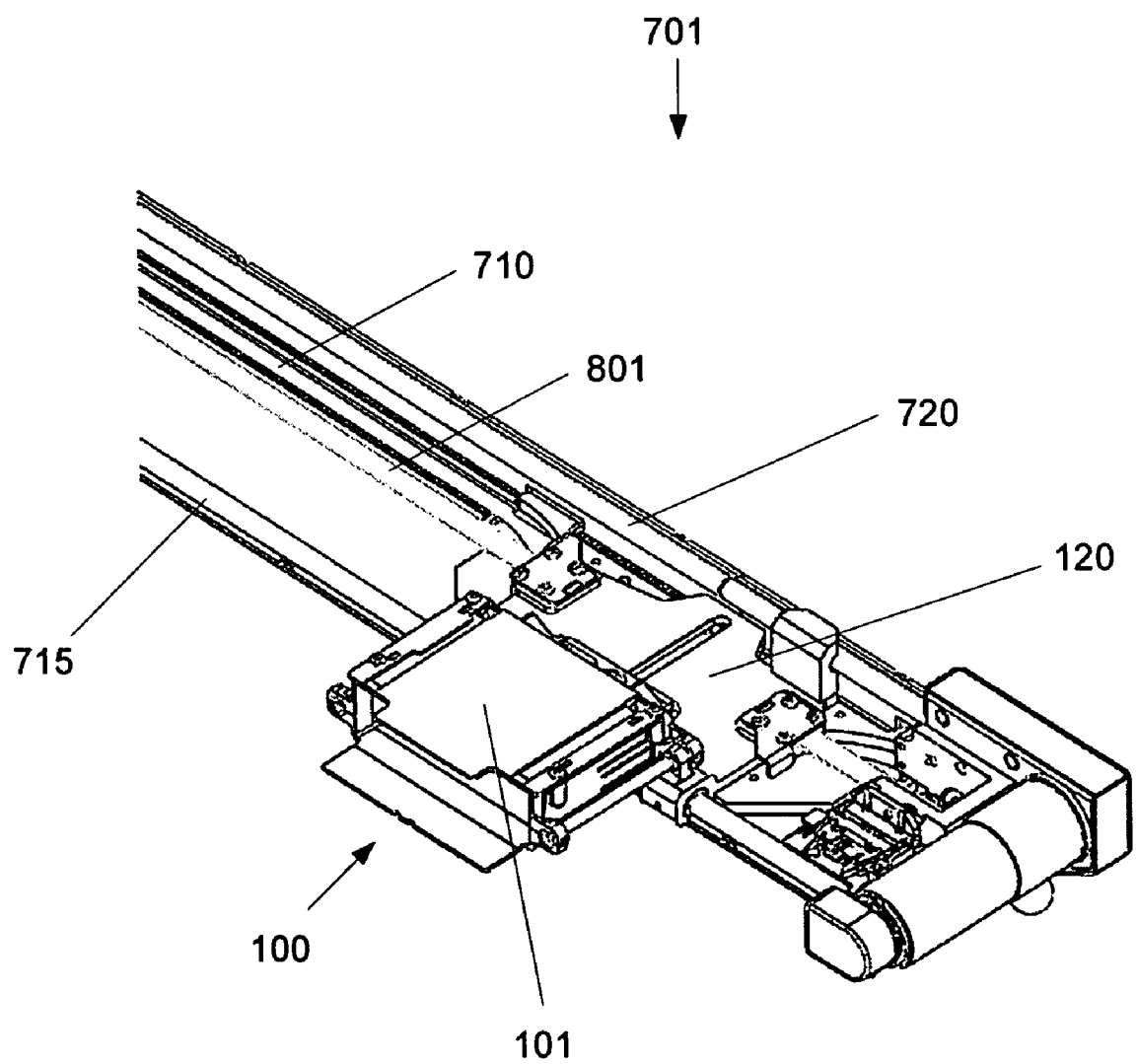
FIG. 9 shows a perspective view of one end of a track and a transporter on the track.

FIG. 8 shows a close-up perspective view of one end of the track shown in FIG. 7. A belt cable 801 that connects to a driver is shown. The cam pathway 710 is shown to have a sigmoidal (e.g., "S") shape at one end, and then extending in a relatively straight line. The cam pathway in FIGS. 7, 8, and 9 is shown as a channel defined by segments 810, 811. However, the cam pathway may be any appropriate pathway capable of guiding the cam follower. For example, the cam pathway may be a rail that the cam follower engages (and thus follows). Furthermore, the cam pathway may define any reasonable pathway for guiding the position of at least a portion of the transporter, such as the shuttle of the transporter. Thus, in some versions, the cam pathway smoothly transitions position (e.g., by gradually curving) over the length of the track.

FIG. 9 shows a close-up perspective view of another end of the track shown in FIG. 7. The transporter 100 is fully extended by the cam follower (not shown). The transporter is shown attached to belts 801 that are connected to a driver for moving the transporter in the direction of the track. The cam follower is positioned in the cam pathway 801. The track comprises two rods 715, 720 on which a region of the transporter is movably supported so that the transporter may slide along these rods as the driver moves the transporter. In some versions, the track does not include rods. In some versions, the track includes only a single rod.

Storage Systems

The transporters, tracks and slider devices described herein may be used as part of a system of managing, storing, saving and retrieving data from data storage devices. In particular, transporters and tracks may be used as part of a library storage system such as those described in U.S. Pat. No. 5,760,995, U;S. Pat. No. 6,766,412, U.S. Pat. No. 6,097,566, herein incorporated by reference in their entirety.

In general, a storage system may comprise a track connecting two or more storage libraries. The track may include a cam pathway that may guide a cam follower on a transporter, thereby helping to control the location of the shuttle of the transporter. The cam pathway and cam follower may allow precise positioning of the shuttle to permit storage systems to transport data storage media between storage libraries.

The shuttle of the transporter receives and holds data storage devices (e.g., cartridges) so that they may be transported between storage libraries. Typically, a robotic handler (e.g., a robotic picker) is used to manipulate storage media within each storage library. A cam pathway and a cam follower may position the shuttle of a transporter so that it can be accessed by a robotic picker within each storage library. In one version, the cam pathway and cam follower causes the shuttle to extend, allowing a robotic picker access to the opening and holding bin portions of the shuttle. For example, a cam pathway as shown in FIG. 7 may extend the shuttle within each library storage system (where the shuttle-can be accessed by the robotic pickers) and may retract the shuttle (so that it is out of the way) as the shuttle is moved between the library systems by a driver. The mechanical interaction between the shuttle, the cam follower and the cam pathway translates one-dimensional movement of the driver (e.g., along the track) into two-dimensional motion of the shuttle (e.g., extending and retracting the shuttle) as it is moved along the track.

Figure 10:
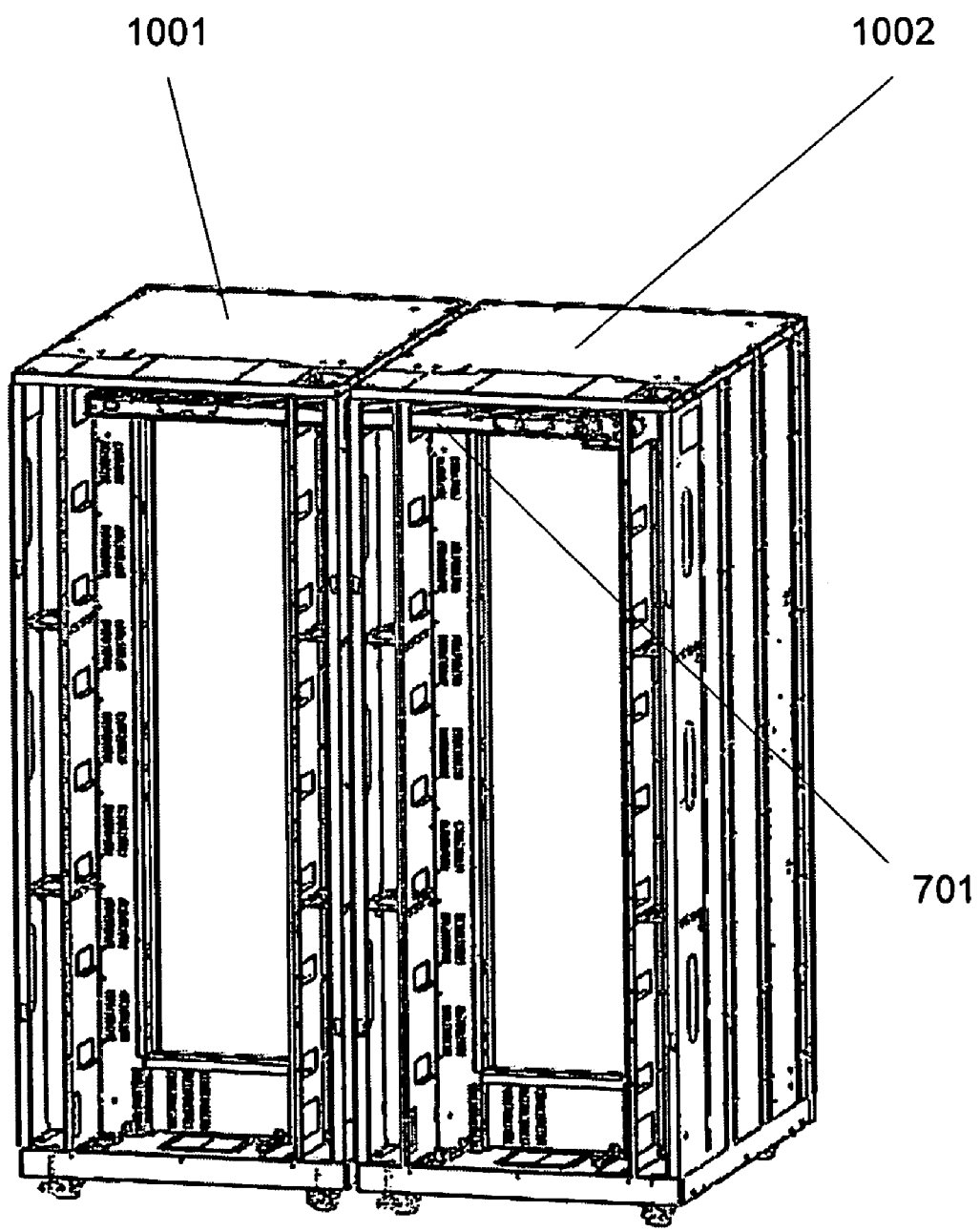
FIG. 10 shows a perspective view of the back of two storage libraries connected by a track.

The track may be positioned in any appropriate position within each connected storage library. FIG. 10 shows a rear perspective view of two storage libraries 1001, 1002 that are connected by a track 701 in the rear, upper portion of both storage libraries. In FIG. 10, this track location is substantially free of interference with other parts of the storage libraries (e.g., storage bins, drives, cables, and the like). Thus, although the track is positioned out of the way, a transporter may be used with the track to transport cartridges between the libraries (e.g., though a pass-through region on the side of both storage libraries).

In FIG. 10, the storage system is shown comprising two tall, rectangular storage libraries which are positioned adjacent to each other and are connected by a track. For the sake of simplicity, additional components of the storage libraries that may be present are not pictured (e.g., storage bins, drives, robotic arms, etc.). Any appropriate storage library may be used.

Figure 11:
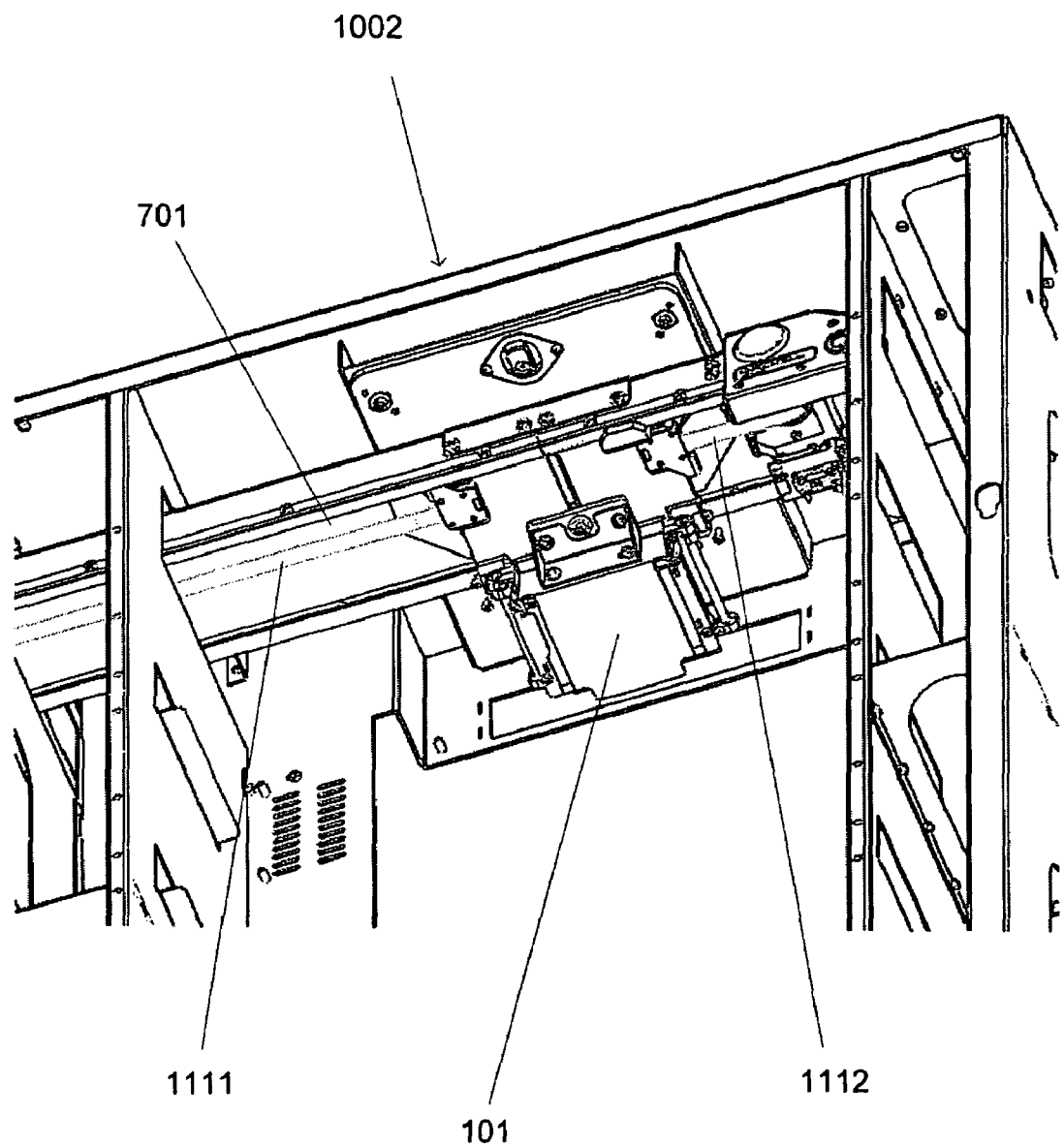
FIG. 11 shows perspective view of one end of a track within a storage library.

FIG. 11 shows a more detailed view of part of the storage system 1000 shown in FIG. 10. In FIG. 11, a transporter 100 is shown below a track 701 comprising a cam pathway in one of the storage libraries 1002. The shuttle 101 is shown extended, and the transporter is connected to belts 1111, 1112 that are moved by a driver, thereby moving the transporter along the track 701.

The storage system may also include one or more sensors for detecting the position or status of components of the storage system, such as the transporter or track. For example, sensors may report the location of the transporter (e.g., its location within any particular library storage cavity, whether it is in a predetermined position, etc.), the status of the shuttle (e.g., determining whether a storage device is present, which storage device is present, the position of the shuttle, etc.), and the amount of force being applied to translate the transporter (e.g., to prevent damage, or provide feedback). In one version, the data storage system comprises sensors for detecting the position of the transporter within the storage system.

Any appropriate sensor may be used, including optical sensors (e.g., cameras, light diodes, etc.), mechanical sensors (e.g., pressure), and the like. Multiple sensors may be used to perform different, related, or overlapping functions. Sensors may be connected to a central controller, or they may be used in limited control loops. In some versions, each storage library has a controller (e.g., a system controller board) which may be coordinated with the controllers of the other libraries within the storage system or with an overseer controller for coordinating activity within all of the libraries, including passing storage devices between libraries and tracking data storage media within the storage system. Controllers may communicate with each other by IR connections, by cables, or by any other appropriate method. In one version, a central controller may be used to control the storage system. Any of the controllers may include inputs and outputs for interaction with users.

Operating the Storage System

Described herein are slider devices that may be used to extend or retract a slider frame, despite some misalignment. The slider devices may be incorporated into storage systems that may be used to transfer storage devices between two or more storage libraries.

In operation, a slider device may extend or retract a slider frame (e.g., a shuttle), along two or more approximately parallel shafts that are elastically mounted to the slider frame when the shafts are each slideably disposed within a fixed shaft support. Force may be applied to slide the slider device. In some versions, a force is applied to move the slider from a direction that is not approximately parallel with the long axis of the shafts, causing misalignment.

For example, in one version, a slider device may have a slider frame (e.g., a shuttle), a fixed frame (e.g., a carrier platform), two approximately parallel shafts, four mounting (elastic) rings and four end caps. The two shafts may be attached to the slider frame by mounting them into bores on the slider frame. The bore is sized to receive the flexible mounting ring (e.g., an elastic O-ring), and the end of the shaft presses into the inner diameter of the ring. A shallow groove cut into the shaft may position the ring on the shaft. The ring may be compressed by the fit between the shaft and the bore, thus helping to maintain the shaft concentrically within the bore in the slider frame. A screw threaded into each end of the shaft may act as a stop, and may also restrict the movement of the shaft in the sliding direction. If the center distance between the shafts and the bearings changes as the frame slides (e.g., if the shafts are misaligned, or twisted), then a small force will be applied to the shaft and transmitted to the elastic mounting ring; this force may cause the flexible ring to move, realigning the center distances. This action can take place simultaneously in two dimensions.

One or more portions of a storage system, such as the shuttle of a transporter, may be configured as a slider device. In operation, a storage system may connect multiple storage libraries, and allow passage of storage devices between the storage libraries. A transporter comprising a shuttle and a cam follower may be moved along a track connecting two or more storage libraries so that the cam follower follows a cam pathway region of the track. A driver may move the transporter within and between the storage libraries. Thus, a cartridge or other appropriate storage media may be transferred between storage libraries using the storage system.

For example, a cartridge from a first library may be placed within the shuttle of the transporter (e.g., by a robotic picker), and the transporter may be moved from the first library to a second library. As the transporter is moved, the cam follower may position the shuttle by following the cam pathway. Thus, when the cartridge is loaded into the shuttle, the shuttle may be extended towards the front of the storage library, towards the robotic picker, because the cam pathway is curved towards the front of the storage library at this point along the track (relative to the rest of the cam pathway). The cam pathway may curve towards the back of the track (away from the robotic picker) over the portion of the track extending from the loading/unloading position in the first library and a loading/unloading position in the second library. As the transporter is moved from the starting position towards the second library, the cam follower will follow the cam pathway, and therefore retract the shuttle. Thus, the shuttle is moving both along the track towards the second library, and towards the back of the library system, away from the robotic picker. The retracted position may make it easier for the transporter to maneuver within the cavity of a storage library.

A portion of the cam pathway within the second library may curve towards the front of the library, closer to the robotic picker (e.g., corresponding to a load/unload position for the transporter within the second library). Once the transporter has moved into the second storage library, the cam follower (following the cam pathway) will extend the shuttle of the transporter towards the front of the second storage library, positioning the shuttle so that the robotic picker may remove or insert a cartridge from the shuttle. Thus, the shuttle may be precisely positioned by the cam follower, following the cam pathway.

The above detailed description is provided to illustrate various examples and is not intended to be limiting. It will be apparent to those of ordinary skill in the art that numerous modification and variations within the scope of the present invention are possible. For example, various examples described herein may be combined and altered. Further, numerous other devices and processes not explicitly described herein may be used with the exemplary storage device holders and extensible supports described, as will be recognized by those of ordinary skill in the art. Furthermore, the description has discussed particular examples as well as ways in which these examples may address certain disadvantages in related art. This discussion is not meant, however, to restrict the various examples to methods and/or systems that actually address or solve the disadvantages. Accordingly, the present invention is defined by the appended claims and should not be limited by the description herein.

What is claimed is:

1. A slider device having a misalignment tolerance, said device comprising:
    a slider frame;
    two parallel shafts elastically mounted to the slider frame; and
    a plurality of fixed shaft supports having passages therethrough, wherein each shaft is slideably disposed within the passage of at least one of the fixed shaft supports, so that the slider frame be able to extend or retract in a direction parallel to the shafts.

2. The slider device of claim 1, further comprising a carrier platform, wherein the fixed shaft supports are fixed to the caffier platform.

3. The slider device of claim 1, wherein the slider frame comprises a slider frame support to limit movement of the slider frame in direction that is not parallel to the parallel shafts.

4. The slider device of claim 3, wherein the slider frame support comprises a cam follower.

5. The slider device of claim 1, wherein at least one of the fixed shaft supports comprise a low-friction surface.

6. The slider device of claim 1, wherein the fixed shaft supports comprise bushings.

7. The slider device of claim 1, wherein the shafts comprise a rigid material.

8. The slider device of claim 7, wherein the shafts comprise a material selected from the group consisting of metal, ceramic, polymer, or some combination thereof.

9. The slider device of claim 1, further comprising a plurality of shaft mounts, wherein the shafts are elastically mounted to the slider frame by the shaft mounts.

10. The slider device of claim 9, wherein the shaft mounts comprise an elastic material at least partly surrounding the shaft.

11. The slider device of claim 9, wherein each shaft mount comprises an elastic O-ring.

12. The slider device of claims 10 wherein the elastic material is selected from the group consisting of rubbers, polyisoprenes, polybutadienes, polyisobutylenes, urethanes and polyurethanes.

13. The slider device of claim 9, further comprising a plurality of securing screws, wherein each shaft is secured within a shaft mount by a securing screw.

14. The slider device of claim 1, wherein the slider device comprises the shuttle of a storage system.

15. The slider device of claim 14, wherein the slider frame is configured to hold a cartridge.

16. A transporter for transporting a storage device, wherein the transporter comprises:
a shuttle for holding a storage device comprising the slider device of claim 1; and a cam follower for following a cam pathway.

17. The slider device of claim 1, wherein each elastically mounted parallel shaft shifts in order to maintain the shaft extending in a direction that is parallel with the direction of the passage though the fixed shaft support through which the shaft is slideably disposed.

18. A slider device having a misalignment tolerance, said device comprising:
a slider frame having two parallel shafts, wherein the slider frame is configured to be extended and retracted in a direction parallel to the shafts;
a shaft assembly for each shaft, wherein each shaft assembly comprises:
one of the shafts;
a shaft support having a passage therethrough, wherein said one shaft is slideably disposed within the shaft support; and
an elastic coupling, wherein the elastic coupling is configured to elastically deform in order to keep said one shaft extending in a direction that is parallel with the direction that the passage through the shaft support extends.

19. A method of sliding a slider device having a high misalignment tolerance, comprising:
moving a slider device to extend or retract a slider frame of the slider device, wherein the slider device comprises:
a slider frame; and
a plurality of parallel shafts elastically mounted to the slider frame, wherein each of the parallel shafts is slideably disposed within a passage through a fixed shaft support.

* * * * *